Oct. 19, 1937.   J H. HUNT ET AL   2,096,177

METHOD OF MAKING BRAKE DRUMS

Filed Aug. 22, 1935

INVENTOR.
J HAROLD HUNT
ANDREW S. VAN HALTEREN
BY Carroll R. Taber
ATTORNEY.

Patented Oct. 19, 1937

2,096,177

UNITED STATES PATENT OFFICE 2,096,177

METHOD OF MAKING BRAKE DRUMS

J. Harold Hunt and Andrew S. Van Halteren, Lansing, Mich., assignors to Motor Wheel Corporation, Lansing, Mich., a corporation of Michigan Application August 22, 1935, Serial No. 37,272

6 Claims. (Cl. 29—152.2)

This invention relates to brake drums of the type wherein the brake ring and the brake drum web are separately formed and thereafter attached to each other to form a composite drum. Specifically the invention has to do with the method of manufacturing brake drums of this character to provide a novel and economical method of forming a brake drum ring and a novel means for attaching the ring to the web.

The present application is a continuation in part of our earlier copending application Serial No. 551,682, filed July 18, 1931, entitled Brake drums, which resulted in the issuance on January 28, 1937 of Patent No. 2,069,071.

Illustrative examples of the invention are shown in the accompanying drawing, wherein.

Figure 1:
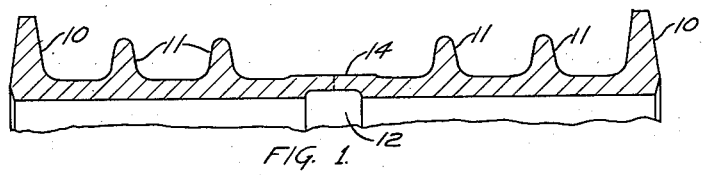
Figure 1 is a partial sectional view of a metal cylinder adapted to be cut to form a pair of identical brake drum rings.

The metal cylinder shown in Figure 1 is preferably formed from a strip of metal of suitable length by coiling the same and welding the ends thereof together. The particular section shown in Figure 1 is preferably produced at the mill. That is to say, the metal is formed in strips at the mill with the ribs 10 and 11 and with the central groove 12 which provides an annular zone of reduced thickness.

Figure 2:
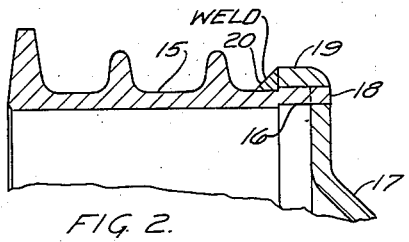
Figure 2 is a partial sectional view of a brake drum showing one of the rings formed from the cylinder of Figure 1 attached to a brake drum web.
Figure 3:
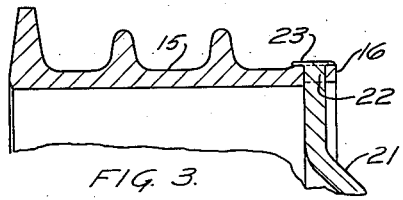
Figure 3 is a partial sectional view of a brake drum showing a modified means for attaching the ring of Figure 2 to a brake drum web.

After the cylinder has been formed as just described it is severed midway between its edges along the dotted line 14 to produce a pair of brake drum rings 15 (as shown in Figure 2 and Figure 3) having edge portion 16 of reduced thickness. Where it is desired to attach the ring 15 to a brake drum web 17 as shown in Figure 2, the reduced edge portion 16 of ring 15 is cut away at intervals to provide the integral projection 18. The brake drum web 17 is provided with cooperating openings adjacent its periphery to receive the integral projection 18. The ring and web 17 are assembled with the projection 18 extending into the opening of the web 17 and with the peripheral portion 19 of web 17 flanged over the outer surface of ring 15. As shown in Figure 2 the ring 15 and web 17 are permanently attached to each other as by welding at 20. If desired the welding may be dispensed with and the projection 18 formed of greater length whereby the same may project through the cooperating opening in web 17. When this is done the free extremities of projection 18 may then be enlarged or otherwise deformed to provide the necessary means for permanently attaching the ring and web together.

Figure 4:
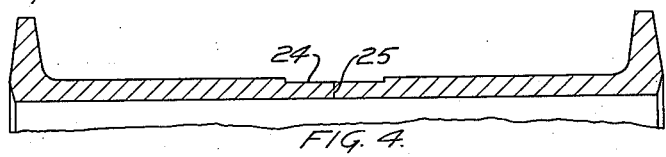
Figure 4 is a partial sectional view of a modified form of metal cylinder adapted to be cut intermediate its edge to produce a pair of brake drum rings.

The metal cylinder shown in Figure 4 differs from that shown in Figure 1 primarily in cross sectional configuration. Like the cylinder in Figure 1 it is preferably formed from stock as received from the mill by coiling a strip of suitable length and welding the ends thereof together. Also like the cylinder in Figure 1 it is provided with a central annular zone 24 of reduced section.

Figure 6:
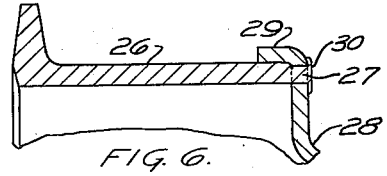
Figure 6 is a partial sectional view of a brake drum illustrating a modified means for attaching the ring of Figure 5 to a brake drum web.

The cylinder shown in Figure 4 is cut midway between its edges along dotted line 25 to produce a pair of brake drum rings 26 of the shape illustrated in Figure 6, each having a reduced edge portion. The reduced edge portion of ring 26 is cut away at intervals to produce integral projection 27. A brake drum web 28 is provided having a plurality of openings formed adjacent its periphery for the reception of integral projection 27. The ring 26 and web 28 are assembled with projection 27 of the former extending into the opening of the latter and with the peripheral portion 29 of web 28 flanged over the outer surface of ring 26. The free extremities of projections 27 are enlarged as indicated at 30 to permanently attach the ring and web together.

Figure 5:
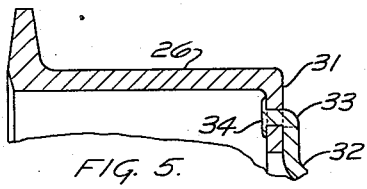
Figure 5 is a partial sectional view illustrating the manner in which a ring formed from the cylinder of Figure 4 may be attached to a brake drum web.

As shown in Figure 5 the reduced edge portion of ring 26 is bent over to form a radially extending attaching portion 31. This portion is then provided with suitable spaced openings for the reception of projections carried by a brake drum web. In this form the ring is attached to a web 32 having integral peripheral projections 33. Ring 26 and web 32 are assembled with the projections 33 of the latter extending into the openings in flange 31 of the former. The free extremities of projections 33 are enlarged as indicated at 34 to permanently attach the ring and web together.

Figure 7:
Figure 7 is a partial sectional view of a still further modified form of metal cylinder from which a pair of brake drum rings may be formed by cutting the same around its center line.

The cylinder shown in Figure 7 is preferably formed in the manner described in connection with the cylinders shown in Figures 1 and 4. In this instance the cylinder is provided with an annular groove of substantial depth midway between its edges, the material forming this groove being of reduced thickness.

Figure 8:
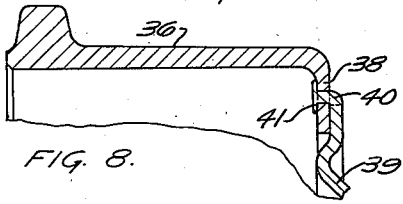
Figure 8 is a partial sectional view of a brake drum illustrating the manner in which a brake ring formed as in Figure 7 may be attached to a brake drum web.

The cylinder of Figure 7 is cut along the dotted line 35 to produce a pair of brake drum rings which subsequently take the form of rings 36 and 37 shown in Figures 8 and 9, respectively.

Figure 10:
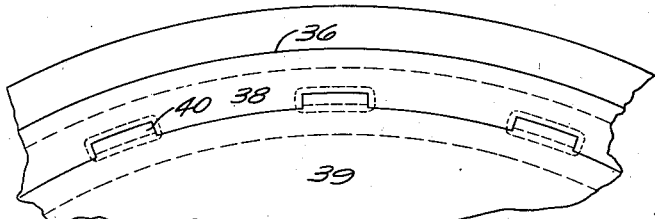
Figure 10 is a partial side view in elevation of the brake drum illustrated in Figure 8.

After the cylinder in Figure 7 has been cut along the dotted line 35 a ring is provided having a reduced edge portion. This edge portion as shown in Figure 8 is bent radially inwardly to form a substantial radially extending attaching portion 38. The portion 38 is provided with a plurality of spaced openings for the reception of projections carried by a brake drum web. As shown in Figure 8 a brake drum web 39 is provided with integral projections 40 at its periphery. The ring 36 and web 39 are assembled with the projections 40 of the latter extending into the openings formed in the flange 38 of the former. The free extremities of projection 38 are enlarged as indicated at 41 to permanently attach the ring to the web. Figure 10 shows a rear view in elevation of the drum of Figure 8.

Figure 9:
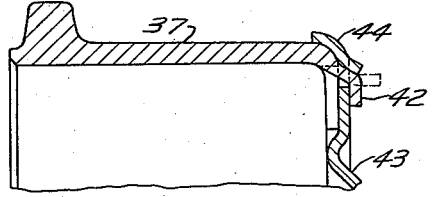
Figure 9 is a partial sectional view of a brake drum illustrating a modified manner of attaching the brake drum ring of Figure 7 to a brake drum web.

A modified method of attaching rings formed from the cylinder of Figure 7 to a web is illustrated in Figure 9. In this form of attachment the reduced edge portion of ring 37 is cut away to provide a plurality of integral projections 42, originally having the shape shown by the dotted lines. A brake drum web 43 is provided having spaced openings formed therein adjacent its periphery for the reception of projections 42. The ring 37 and web 43 are assembled with the projections 42 of the former extending into the said openings in the latter and with the peripheral portion 44 of web 43 engaging the outer surface of ring 37. After the projections 42 have been inserted into the openings of web 43 they are flanged over as clearly shown by the full lines in Figure 9 to permanently attach the ring to the web.

From the foregoing description it will be apparent that the present invention provides a novel method of forming brake drum rings and novel means for attaching such a ring to a brake drum web. By the provision of the double ring having a central annular zone of reduced thickness it is possible to form a pair of identical brake rings each having an edge portion of reduced thickness. This is advantageous since it not only effects a saving of material, but also facilitates the deformation of such edge portion to produce various forms of attaching portions utilized in fastening the ring to the brake drum web.

While only selected embodiments of the invention have been herein shown and described, it should be understood that the invention is not limited to such embodiments but is co-extensive with the scope of the appended claims.

We claim:

1. The method of manufacturing brake drums which comprises providing a metal cylinder having a central annular zone of reduced thickness, severing the cylinder in said zone to produce a pair of brake rings each having an edge portion of reduced thickness, bending said edge portion of each ring to form an attaching portion of reduced thickness, providing a brake drum web for each of the rings having a peripheral attaching portion, forming cooperating integral projections and openings in said attaching portions, and assembling the rings and webs with the integral projections extending into the cooperating openings whereby to produce a pair of identical brake drums.

2. The method of manufacturing brake drums which comprises providing a metal cylinder of a central annular zone of reduced thickness, severing the cylinder in said zone to produce a pair of brake rings each having an edge portion of reduced thickness, bending said edge portions out of their original plane, forming a plurality of spaced integral projections on each edge portion, providing a circular brake drum web for each ring, forming a plurality of spaced openings in the peripheral portion of the webs, and assembling the rings and webs with the integral projections of the former extending into the openings of the latter whereby to produce a pair of identical brake drums.

3. The method of manufacturing brake drums which comprises providing a metal cylinder having a central annular zone of reduced thickness, severing the cylinder in said zone to produce a pair of brake rings each having an edge portion of reduced thickness, bending said edge portions to form substantially radially extending attaching portions, forming spaced openings in said attaching portions, providing a circular brake drum web for each of the rings, forming spaced integral projections adjacent the periphery of each of the webs, and assembling the rings and webs with the projections of the latter exending into the openings of the former whereby to produce a pair of identical brake drums.

4. The method of manufacturing brake drums which comprises providing a metal cylinder, severing the cylinder midway between its edges to produce a pair of brake rings, bending one edge of each ring to form a substantially radially extending attaching portion, forming a plurality of spaced openings in said attaching portions, providing a circular brake drum web for each of the rings, forming a plurality of spaced integral projections in the peripheral portion of the webs, and assembling the rings and webs with the projections of the latter extending into the openings of the former whereby to produce a pair of indentical brake drums.

5. The method of manufacturing brake drums which comprises providing a cylindrical brake ring having an edge portion of reduced thickness, bending said edge portion to form a substantially radially extending attaching portion, forming spaced openings in the attaching portion, providing a circular brake drum web, forming spaced integral projections in the peripheral portion of the web, assembling the ring and web with the projections of the latter extending through the openings in the former and deforming the free extremities of said projections to lock the ring and web together.

6. The method of manufacturing brake drums which comprises providing a metal cylinder having a central annular zone of reduced thickness, severing the cylinder in said annular zone to produce a pair of brake rings each having an edge portion of reduced thickness, bending the reduced edge portion of each of the rings to produce a radial flange for engagement with a brake drum web, providing circular brake drum webs having peripheral portions adapted for engagement with said reduced edge portions, and attaching the peripheral portion of each web to the reduced edge portion of one of the rings.

J. HAROLD HUNT.
ANDREW S. VAN HALTEREN.